United States Patent [19]

Yokoyama

[11] Patent Number: 4,895,694

[45] Date of Patent: Jan. 23, 1990

[54] APPARATUS FOR ALIGNING NUCLEAR FUEL PELLETS

[75] Inventor: Bungo Yokoyama, Ibaraki, Japan

[73] Assignee: Westinghouse Electric Corp., Pittsburgh, Pa.

[21] Appl. No.: 276,170

[22] Filed: Nov. 17, 1988

[30] Foreign Application Priority Data

Aug. 12, 1987 [JP] Japan ............................. 62-123530

[51] Int. Cl.⁴ ............................................ G21C 21/02
[52] U.S. Cl. ................................. 376/261; 53/495; 53/542; 53/247; 414/146
[58] Field of Search ................. 376/260, 261; 29/906, 29/723; 414/146, 48, 63; 53/495, 496, 498, 532, 542, 247

[56] References Cited

U.S. PATENT DOCUMENTS

| | | | |
|---|---|---|---|
| 3,897,673 | 8/1975 | Kee et al. | 376/261 |
| 4,243,078 | 1/1981 | Sahlin | 53/244 |
| 4,304,324 | 12/1981 | Huggins | 53/247 |
| 4,468,163 | 8/1984 | King et al. | 414/63 |
| 4,566,835 | 1/1986 | Raymond et al. | 376/261 |

FOREIGN PATENT DOCUMENTS 59-171086  11/1984  Japan .

Primary Examiner—Daniel Wasil
Attorney, Agent, or Firm—L. A. DePaul

[57] ABSTRACT

An apparatus for aligning nuclear fuel pellets includes an endless belt for advancing nuclear fuel pellets along a generally linear path in a direction generally coincident with their axes and a stopper element disposed in the linear path for stopping advancement of the pellets therealong for assembling pellets in a row. A detector device senses when advancement of a prescribed number of the pellets in a row have been stopped by the stopper element. A feed mechanism is operable for successively feeding pellet holding trays one at a time to a pellet receiving position along the linear path. A panel defines an inclined path extending from the linear path downward to the one tray disposed at the receiving position. An ejector mechanism disposed along the linear path is responsive to the detector device for pushing the assembled row of pellets sidewise from the linear path along the inclined path of the panel to a groove defined in the one tray. A guide mechanism provided adjacent the linear path is operable for guiding the row of pellets down the inclined path to the tray. A pellet grasping mechanism is disposed along the linear path for blocking advancement of more pellets along the linear path once the detector device has sensed when advancement of the pellets has been stopped by the stopper element.

15 Claims, 4 Drawing Sheets

APPARATUS FOR ALIGNING NUCLEAR FUEL PELLETS

BACKGROUND OF THE INVENTION

1. Field of the Invention

The present invention relates generally to nuclear fuel pellet production and, more particularly, is concerned with an apparatus and method for aligning nuclear fuel pellets and placing them in trays row by row.

2. Description of the Prior Art

It is conventional practice in processing fuel pellets to employ an apparatus for picking individual fuel pellets from a transport conveyor, aligning the fuel pellets in a row and transferring the row of pellets onto a grooved tray. One prior art apparatus described in Jitsugansho Application No. 58-64160 has been used heretofore to carry out these operations.

Although this prior art apparatus is highly reliable, every time one pellet is discharged from the transport conveyor and transferred to the tray, a great amount of intermittent movements of components of the apparatus are required. From the point of view of wear, the amount of energy consumed, the cost, etc., there is a limit to the speed at which components undergoing such movements can process pellets. Therefore, it is difficult to improve the speed of operations performed by components of this apparatus beyond the current levels.

Due to recent increases in pellet production capacity, one of the problems associated with the prior art apparatus is that its pellet processing speed has not kept pace with pellet fabrication speed. Consequently, a need exists for improvements which will increase the speed at which fuel pellets can be processed so as not to constrain the higher pellet fabricating speed.

SUMMARY OF THE INVENTION

The present invention provides a nuclear fuel pellet aligning apparatus and method designed to satisfy the aforementioned needs. The aligning apparatus of the present invention utilizes components which constantly and continuously, as opposed to intermittently, transfer pellets. By this mode of operation, the speeds of transporting, aligning and packaging pellets are increased, the recently increased speed of pellet fabrication is not constrained, and the efficiency of the pellet alignment operation is increased.

Accordingly, the present invention is directed to a nuclear fuel pellet aligning apparatus which comprises: (a) means for advancing nuclear fuel pellets along a first path; (b) means disposed in the first path for stopping advancement of the pellets therealong for assembling a row of the pellets along the first path; (c) means disposed along the first path for sensing when advancement of a prescribed number of pellets in a row have been stopped by the advancement stopping means; (d) means for feeding a pellet holding tray to a pellet receiving position along the first path; (e) means defining a second path extending from the first path to the tray disposed at the receiving position; and (f) means disposed along the first path and being responsive to the sensing means for transferring the pellets in the row thereof from the first path along the second path to the tray disposed at the receiving position. The first path is generally linear, whereas the second path is generally inclined downwardly from the linear path to the pellet holding tray.

The present invention also is directed to a method for aligning nuclear fuel pellets, comprising the steps of: (a) advancing nuclear fuel pellets along a linear path; (b) stopping advancement of the pellets therealong for assembling a row of the pellets along the linear path; (c) sensing when advancement of a prescribed number of pellets in a row have been stopped; (d) feeding a pellet holding tray to a pellet receiving position below the linear path; and (e) in response to the sensing, transferring the pellets in the row thereof from the linear path downwardly along an inclined path to the tray disposed at the receiving position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Nuclear Fuel Pellet Aligning Apparatus

Figure 1:
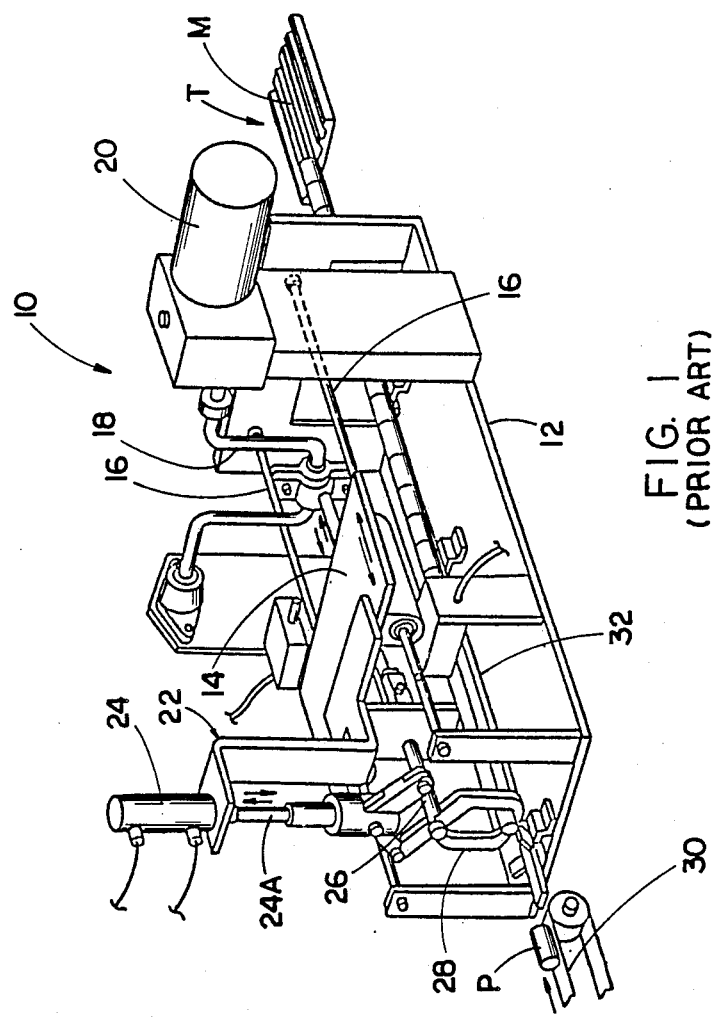
FIG. 1 is a perspective view of the prior art nuclear fuel pellet aligning apparatus.

Referring now to the drawings, and particularly to FIG. 1, there is shown a perspective view of the prior art pellet aligning apparatus, generally designated 10, which was mentioned briefly in the background section supra. The prior art pellet aligning apparatus 10 includes a frame 12, a sliding body 14 which can slide back and forth along a pair of spaced guide rods 16 which are fixed to the frame 12. The sliding body 14 is connected to a crankshaft 18 rotatably mounted to the frame 12 and rotatably driven by a motor 20. Rotation of the crankshaft 18 causes the sliding body 14 to move linearly forward and rearward (right and left as seen in FIG. 1) on the guide rods 16.

On the rearward end of the sliding body 14 is mounted an upright bracket 22. A hydraulic cylinder 24 and a fore and aft extending shaft 26 are mounted to the bracket 22. A gripper chuck 28 is pivotally mounted to the outer end of the shaft 26 for movement between nongripping opened and gripping closed positions. The piston rod 24A of the hydraulic cylinder 24 is connected to the gripper chuck 28 so as to actuate the chuck between its opened and closed positions upon extension and retraction of the hydraulic cylinder piston rod 24A.

When the sliding body 14 is in the rear limit position (toward the left end of the frame 12 in FIG. 1), pellet P which is transported by the conveyor belt 30 can be picked up and removed from the conveyor by operation of the hydraulic cylinder 24 actuating the gripper chuck 28 to its closed position. When the sliding body 14 then moves to the front limit position (toward the right end of the frame 12 in FIG. 1), the pellet is placed on a grooved rail 32 fixed on the frame 12 below the sliding body 14. Operation of the hydraulic cylinder 24 actuating the gripper chuck 28 to its opened position releases the pellet P onto the grooved rail 32.

The forward end of the grooved rail 32 matches the pellet support grooves M of the trays T which are transported one by one by a tray transport mechanism (not shown). When a predesignated number of pellets have entered the one groove M, the tray T is indexed or moved a distance of one groove M by the transport mechanism referred to above.

When the above-described apparatus 10 is used, the pellet P is transported by tightly holding it by the gripper chuck 28 and is placed securely into the tray T. One of the major advantages of the apparatus 10 is its high reliability. However, every time a pellet P is discharged, a great deal of movement is required, such as rotation of the crankshaft 18, reciprocatory movement of the sliding body 14, reciprocatory operation of the hydraulic cylinder 24 and opening and closing of the chuck 28. From the point of view of wear and the amount of energy consumed, cost, etc., there is a limit to the transport, alignment and packaging speed; it is difficult to improve the speed of operations beyond the current range.

Improved Nuclear Fuel Pellet Aligning Apparatus

Turning now to FIGS. 2–7, there is illustrated a preferred embodiment of an improved nuclear fuel pellet aligning apparatus, generally designated by the numeral 34 and constructed in accordance with the principles of the present invention. The improved aligning apparatus 34 includes a frame 36, an endless conveyor 38 and a stopping mechanism 40. The conveyor 38 is mounted on the frame 36 for receiving nuclear fuel pellets P at one end 38A thereof and advancing the pellets P along a generally linear path in a direction generally coincident with their axes and toward an opposite other end 38B thereof. The stopping mechanism 40 is disposed in the linear path at the other opposite end 38B of the conveyor 38 for stopping advancement of the pellets P along the linear path for assembling a row of the pellets P in end-to-end contacting relationship along the linear path without empty spaces between the pellets.

Also, the apparatus 34 includes a detector device 42 disposed along the linear path which is capable of distinguishing between motion and no motion for sensing when advancement of a prescribed number of the pellets P in the row have been stopped by the stopping mechanism 40. A pellet transferring mechanism 44 is disposed along the linear path and is responsive to the detector device 42 for transferring the row of pellets P sidewise from the linear path along an inclined path to one of a plurality of trays T disposed at a receiving position adjacent to and below the linear path and at the lower end of the inclined path.

Further, the apparatus 34 includes a feeder mechanism 46 for successively feeding the pellet holding trays T one at a time to the pellet receiving position located at the lower end of the inclined path. The inclined path is defined by a panel 48 which extends from the linear path to the one tray T disposed at the receiving position. Finally, the apparatus 34 includes a blocking mechanism 50 disposed along the linear path adjacent to the one end 38A of conveyor 38 for blocking advancement of more pellets P toward the other end 38B thereof once the detector device 42 has sensed when advancement of the prescribed number of pellets P has been stopped by the stopping mechanism 40.

More particularly, the frame 36 includes a base 52 having at its four corners respective vertical support pillars 54 which are free to rotate. The support pillars 54 are connected, via a drive transmission made up of gear mechanisms 56, rotating shafts 58 and a drive belt 60, to a motor 62 mounted on the base 52. The motor 62 is connected to and its operation controlled at, a control panel (not shown). All pillars 54 are rotatably driven in the same direction at the same speed. The outer periphery of each support pillar 54 forms a male screw along most of its entire surface. A cylindrical female screw part 64 is coupled to each support pillar 54 at the same height. A tray holding base 66 is supported by the pillars 54 through these female screw parts 64. There is also a pair of slots 68 at the ends of the tray holding base 66 adjacent the pillars 54 which receive guide members 70 which are fixed in upright orientation on the frame base 52. As the pillars 54 are rotated in one direction the tray holding base 66 ascends, whereas rotation in an opposite direction causes the tray holding base 66 to descend.

Adjacent to the pillars 54 and tray holding base 66, there is provided a fixed platform 72 upon which is disposed the tray feed mechanism 46 of the apparatus 34. The feed mechanism 46 includes a pair of gear shafts 74 rotatably and horizontally mounted on the platform 72 which each have two individual tray forwarding gears 76. The gear shafts 74 are connected by pulleys 78 and a belt 80 and are rotated in the same direction at the same speed by a motor 82 mounted on the platform 72 and connected to the control panel (not shown) which was mentioned above.

Figure 5:
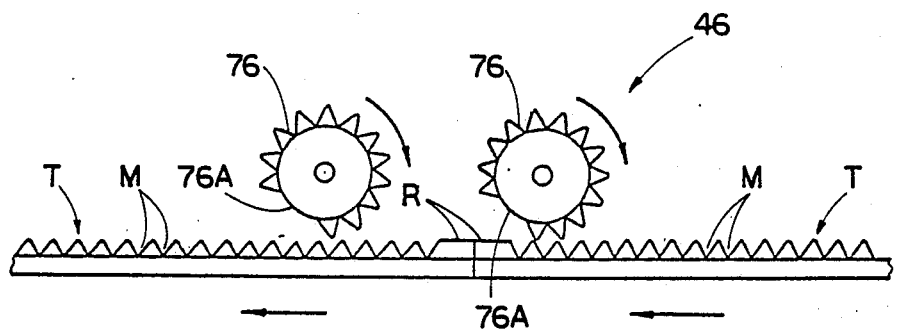
FIG. 5 is an enlarged schematic side elevational view of a portion of the apparatus of FIG. 4.
Figure 6:
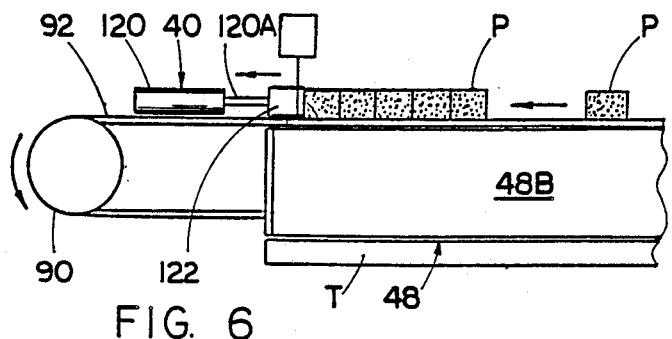
FIG. 6 is an enlarged schematic front elevational view of a portion of the apparatus of FIG. 3 showing the pellets stopped to form a row on a transport belt of the apparatus.
Figure 7:
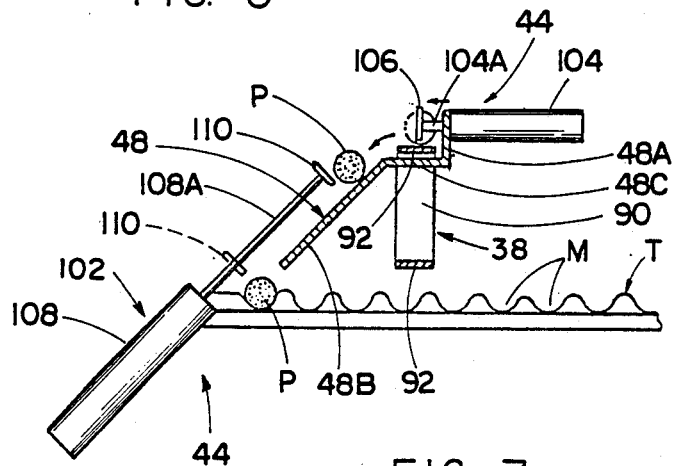
FIG. 7 is an enlarged schematic side elevational view of a portion of the apparatus of FIG. 3 showing the pellets in the row being transferred to and retained upon the tray.

The teeth of the tray forwarding gears 76 are shaped to match the pellet groove M on the top surface of the tray T, as shown in FIG. 5. There are no teeth on the parts 76A of the gears 76 that correspond to both end parts R of the tray T where there is no pellet groove M, and therefore it slides over both terminal parts R. Also, below the tray forwarding gears 76 are support rollers 84 (see FIGS. 2 and 3) to support the lower side of the tray T being moved forward. The support rollers 84 are mounted on shafts 86 journalled to the platform 72.

The endless conveyor 38 of the apparatus 34 is disposed along the forward end of the platform 72. The conveyor 38 includes a pair of laterally spaced belt rollers 88, 90 and an endless steel belt 92 entrained about the rollers 88, 90. The upstream one of the rollers 88 is rotatably mounted on the platform 72 by a bearing 94 and the downstream one of the rollers 90 is drivingly connected to a motor 96 via a reduction gear 98. The steel belt 92 runs between the rollers 88, 90 and parallel to the gear shafts 74. The belt 92 has a width approximately equal to the diameter of the pellets P. The belt 92 defines the linear path along which the pellets P are advanced by the conveyor 38.

The panel 48 of the apparatus 34 defining the inclined path is fixed on the platform 72 along the belt 92 above the leading one of the trays T on the platform 72. The panel 48 has a vertical wall part 48A located rearwardly of the upper run of the belt 92, an inclined slanted part 48B located forwardly of the belt 92 and a horizontal part 48C which extends between interconnects the vertical wall part 48A and the upper edge of the inclined part 48B of the panel 48 and is located below the upper run of the belt 92. Thus, the upper run of the belt 92 passes along the top side of the horizontal part 48C of the panel 48.

The pellet transferring mechanism 44 of the apparatus 34 includes an ejector means 100 operable for pushing the row of pellets P sidewise from the linear path of the belt 92 and a guide means 102 operable for guiding the row of pellets down the inclined part 48B of the panel 48 to the tray T. The ejector means 100 of the transferring mechanism 44 includes a hydraulic cylinder 104 mounted on the platform 72 and controlled from the control panel (not shown) and a pusher member 106 mounted to an extensible and retractible piston rod 104A of the cylinder 104. The piston rod penetrates through the vertical wall part 48A of the panel 48. The pusher member 106 is long and narrow so that it can be disposed by the piston rod 104A forwardly of the panel vertical wall part 48A and rearwardly of a row of pellets P on the upper run of the belt 92 when the piston rod is retracted. The length of the pusher member 106 corresponds to the length of the row of pellets to be transferred to the pellet groove M of the tray T. In this manner, when the hydraulic cylinder 104 is operated to extend its piston rod 104A, the pusher member 106 moves forwardly over the belt 92 so as to push the row of pellets P sidewise off the belt and onto the inclined panel part 48B.

Also, the guide means 102 of the pellet transferring mechanism 44 includes another hydraulic cylinder 108 mounted to the platform 72 and a narrow descent guide board 110 mounted to the piston rod 108A of the cylinder 108. The board 110 has a counterweight 112 attached on one end thereof. When the piston rod 108A is extended, the guide board 110 is disposed adjacent to the upper end of the inclined part 48B of the panel 48 and runs generally parallel to the belt 92. The hydraulic cylinder 108 is inclined generally parallel to the inclined panel part 48B. Thus, as its piston rod 108A is retracted, the guide board 110 travels along the inclined panel part 48B, supporting the row of pellets P as they travel down the inclined part. When the rod 108A of the cylinder 108 is fully retracted, the guide board 110 clears the tray groove. M so that the pellets P can fall into the groove located at the lower end of the inclined part 48B.

Along the upstream portion of the conveyor 38 is mounted a narrow guide channel 114 with a "V" shaped section extending below the upper run of the belt 92, without touching the belt. The channel 114 is located upstream of the inclined panel 48 and its side walls 114A rise up on opposite sides of the belt 92 to prevent pellets P from falling off. By means of a pellet transport route not shown in the drawings, pellets P are placed one by one with their axes along the linear path defined by the belt 92, at intervals, on the belt 92 surrounded by the channel 114.

Figure 2:
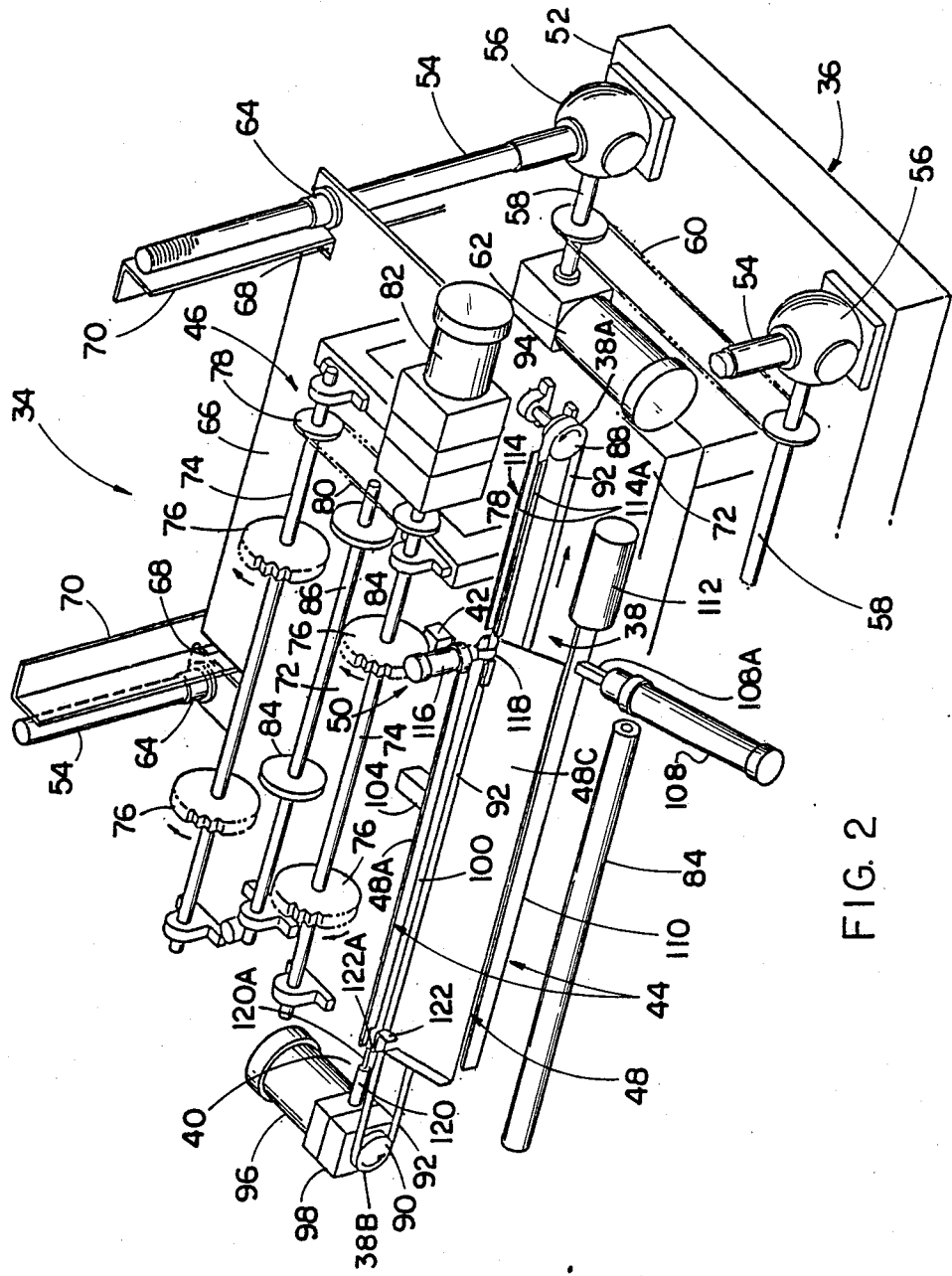
FIG. 2 is a perspective view of the improved pellet aligning apparatus of the present invention.
Figure 3:
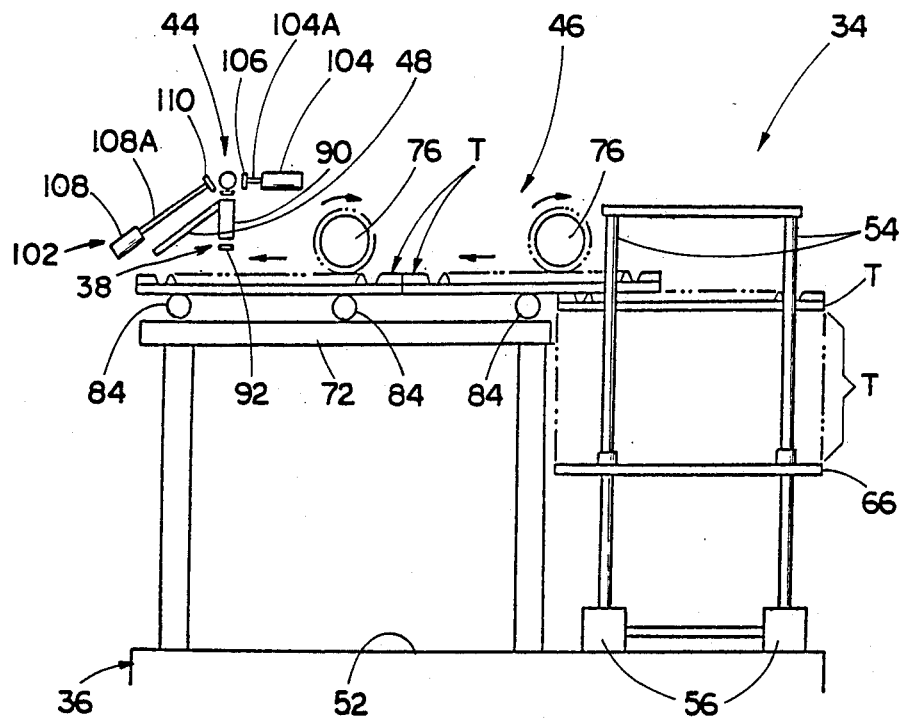
FIG. 3 is a schematic side elevational view of the apparatus of FIG. 2 on a smaller scale.
Figure 4:
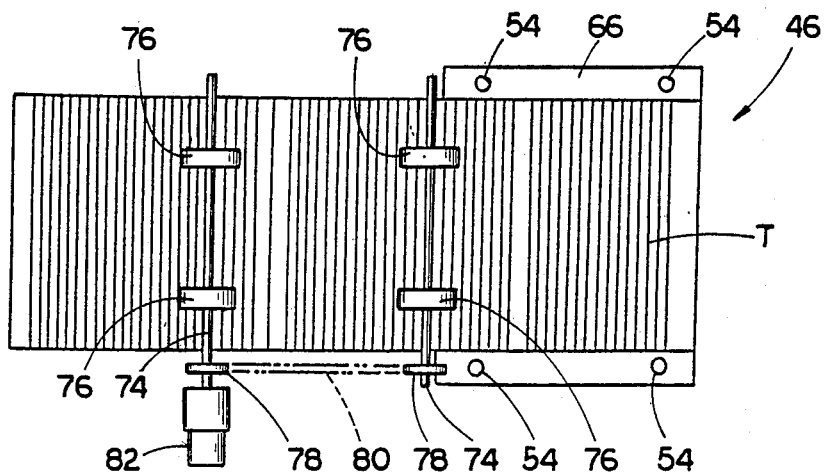
FIG. 4 is a schematic top plan view of the apparatus of FIG. 3 with a tray feed mechanism of the apparatus omitted.

As seen in FIG. 2, the detector device 42 and blocking mechanism 50 of the apparatus 34 are located between the downstream end of the guide channel 114 and the upstream edge of the inclined panel 48, closer to the upstream end 38A of the conveyor 38 than its downstream end 38B. The blocking mechanism 50 includes a clamp cylinder 116 which has claws 118 to grasp a pellet P on the belt 92. The detector device 42 is preferably a photocell. When advancement of the pellets P is stopped by the stopping mechanism 40 reaches the location of the claws 118 (and thus the prescribed number in the row has been reached), the detector device 42 senses such stoppage and generates a signal. In response to the signal, the clamp cylinder 116 is actuated to cause its claws 118 to grasp the pellet P directly below it so that it is retained there.

The stopping mechanism 40 of the apparatus 34 is located adjacent the downstream end 38B of the conveyor 38. The stopping mechanism 40 includes a hydraulic cylinder 120 mounted to the platform 72 and a stopper element 122 mounted on the piston rod 120A of the cylinder 120. The stopper element 122 is adapted to stop the advancement of the pellets P along the linear path by the belt 92. The stopper element 122 also has a "V" shaped part 122A and one end of the pusher member 106 is normally inserted in the "V" shaped part 122A. This arrangement prevents rotation of the piston rod 120A and also acts to control the location of the pusher member 106. The cylinder 120 is connected to the control panel and when the detector device 42 sends a signal, the cylinder 120 is operated to retract its piston rod 120A and pull back the stopper element 122 to near the terminal portion of the panel 48 to release the end of the pusher member 106. The respective hydraulic cylinders 104, 108 of the ejector means 100 and guide means 102 of the pellet transferring mechanism 44 also are operated in response to the signal generated by the detector device 42.

The operation of the apparatus 34 is as follows. Trays T stacked on the tray holding base 66 are raised with the rotation of the pillars 54 by the motor 62. When the tray forwarding gears 76 touch a tray T, the motor 62 stops momentarily and the rise of the trays is discontinued. At the same time, the motor 82 is started and the forwarding gears 76 rotated at the same time in the direction of the arrows in FIG. 2. The trays T are moved one by one across the support rollers 84 toward the forward lower end of the inclined panel 48 until the first pellet groove M of the leading tray T is positioned at the lower end of the panel 48. The motor 82 then stops.

During this time, pellets P are placed one by one on the upstream end 38A of the conveyor belt 92 a the location of the guide channel 114. The continuously moving belt 92 advances the pellets P toward its downstream end 38B. The leading pellet makes contact with, and is stopped by, the stopper element 122 adjacent the downstream end 38B of the conveyor belt 92. The succeeding pellets engage one another and stop also. Therefore, the stopped pellets progressively line up end-to-end on the moving belt 92 until they reach the designated detection position, whereupon the detector device 42 sends a signal to the control board. Then, in response to the signal, the clamp cylinder 116 grasps and fixes the pellet directly below it and the hydraulic cylinders 104, 108 advance the pusher member 106 and the guide board 110, as the hydraulic cylinder 120 retracts the stopper element 122. The row of pellets P are moved sidewise off the belt 92 and pushed down the inclined panel 48. As they move down the inclined path of the panel 48, they stay in a row as their descent is supported and guided by the guide board 110. When the guide board 110 clears the lower end of the panel 48 and the tray groove M, the pellets P drop into the groove and are contained therein.

Also during this time, more pellets P are resting at the location of the guide channel 114, being held stationary due to the leading pellet being grasped by the clamp cylinder 116. But when the pellets are released by the clamp cylinder 116, once the above operations are completed, these accumulated pellets are advanced by the belt 92 to the stopper element 122 at once and the transfer operations can then be repeated.

To recapitulate, in the improved apparatus 34, pellets P are advanced or transported constantly and continuously on the endless conveyor 38 from one end 38A and the flow of pellets is stopped by the stopping mechanism 40 located adjacent the other end 38B of the conveyor 38. When a desired or prescribed number of pellets P are lined up in one row without an empty space between them, they are pushed by the transferring mechanism 44 sidewise from the conveyor 38 so that they descend an inclined or slanted path as a single row and enter a pellet groove M of the tray T placed at the lower end of the slanted path. The tray T is then advanced to a next groove M.

By this operation, the speed of transport, alignment and packaging are increased and the efficiency of the pellet alignment operation is increased. The transport speed is increased since the pellets P are transported and aligned continuously, compared to the conventional apparatus 10 which moves the pellets one by one. Also, while the row of pellets P descend to the tray simultaneously and the tray T is indexed to the next groove M, succeeding pellets are being accumulated upstream so there is no need to halt the transport of pellets.

Also, since the row of pellets P are lowered along the inclined path defined by the panel 48 while being supported by the descent guide member, problems such as the inability to deposit the pellets into the groove M due to a disturbed row, can be avoided. Further, by making the angle of inclination of the slanted panel 48 smaller, and making its width smaller, it is possible to have a design which prevents disturbance of the row when the pellets P are coming down the inclined panel 48, allowing omission of the descent guide member.

Additionally, it is also possible to modify the apparatus 34 by omitting the blocking mechanism 50. In that case, when the prescribed number of pellets P have lined up on the conveyor 38, they are pushed down concurrently with stoppage of movement of the conveyor 38.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An apparatus for aligning nuclear fuel pellets, comprising:
   (a) means for advancing nuclear fuel pellets along a first path;
   (b) means disposed in said first path for stopping advancement of the pellets therealong for assembling a row of the pellets along said first path;
   (c) means disposed along said first path for sensing when advancement of a prescribed number of the pellets in a row have been stopped by said advancement stopping means;
   (d) means for feeding a pellet holding tray to a pellet receiving position located lower than said first path;
   (e) means defining an inclined path extending from said first path to said tray disposed at said receiving position; and
   (f) means disposed along said first path and being responsive to said sensing means for transferring the pellets in the row thereof from said first path along said inclined path to said tray disposed at said receiving position;
   (g) said pellet transferring means including
      (i) an ejector mechanism positioned along one side of said advancing means and being operable in response to said sensing means for pushing the row of pellets sidewise from said first path to initiate movement of the row of pellets down said inclined path, and
      (ii) a guide mechanism positioned along an opposite side of said advancing means and being operable in response to said sensing means for supporting and guiding the row of pellets as they move down said inclined path to said tray.

2. The apparatus as recited in claim 1, wherein said advancing means is an endless belt suspended between a pair of rollers, extending along said first path and having one end at which the pellets are received.

3. The apparatus as recited in claim 2, wherein said stopping means is a stopper element disposed across said first path adjacent the other end of said belt which is opposite from said one end thereof.

4. The apparatus as recited in claim 1, wherein said sensing means is a detecting device for generating a signal when the number of pellets stopped by said stopping means reaches a designated number.

5. The apparatus as recited in claim 4, wherein said ejector mechanism is operable in response to said signal for pushing the pellets sidewise from said first path.

6. The apparatus as recited in claim 5, wherein said guide mechanism is operable in response to said signal for supporting and guiding the pellets from said first path along said inclined path to the tray.

7. The apparatus as recited in claim 1, further comprising:
   blocking means disposed along said first path for blocking advancement of more pellets toward said stopping means once said sensing means has sensed when advancement of the prescribed number of pellets has been stopped by said stopping means.

8. The apparatus as recited in claim 1, wherein said tray feeds means is a feeder mechanism operable to incrementally advance the tray such that a plurality of grooves thereon are successively disposed at a pellet row receiving end of said second path.

9. The apparatus as recited in claim 1, wherein means defining said inclined path is an inclined panel.

10. An apparatus for aligning nuclear fuel pellets, comprising:

(a) endless means for advancing nuclear fuel pellets along a generally linear path in a direction generally coincident with their axes;

(b) means disposed in said linear path for stopping advancement of the pellets along said linear path for assembling a row of the pellets along said linear path;

(c) means disposed along said linear path for sensing when advancement of a prescribed number of the pellets in a row have been stopped by said advancement stopping means;

(d) means for successively feeding pellet holding trays one at a time to a pellet receiving position located lower than said linear path;

(e) a panel defining an inclined path extending from said linear path to one of said trays disposed at said receiving position; and (f) means disposed along said linear path and being responsive to said sensing means for transferring the pellets in the row thereof from said linear path along said inclined path to a groove defined in the one of said trays disposed at said receiving position;

(g) said pellet transferring means including
  (i) an ejector mechanism positioned along one side of said advancing means and being operable in response to said sensing means for pushing the row of pellets sidewise from said linear path to initiate movement of the row of pellets down said inclined path, and
  (ii) a guide mechanism positioned along an opposite side of said advancing means and being operable in response to said sensing means for supporting and guiding the row of pellets as they move down said inclined path to said tray.

11. The apparatus as recited in claim 10, wherein said endless advancing means is a continuous belt suspended between a pair of rollers, extending along said linear path and having one end at which the pellets are received.

12. The apparatus as recited in claim 11, wherein said stopping means is a stopper element disposed across said linear path adjacent the other end of said belt which is opposite from said one end thereof.

13. The apparatus as recited in claim 10, wherein said sensing means is a detecting device for generating a signal when the number of pellets stopped by said stopping means reaches a designated number.

14. The apparatus as recited in claim 10, further comprising:
  blocking means disposed along said linear path for blocking advancement of more pellets toward said stopping means once said sensing means has sensed when advancement of the prescribed number of pellets has been stopped by said stopping means.

15. The apparatus as recited in claim 10, wherein said tray feeds means is a feeder mechanism operable to incrementally advance the tray such that a plurality of grooves thereon are successively disposed at a pellet row receiving end of said inclined path.

* * * * *